United States Patent
Batarseh et al.

[11] Patent Number: 5,959,849
[45] Date of Patent: Sep. 28, 1999

[54] SINGLE-SWITCH AC/DC CONVERTER WITH POWER FACTOR CORRECTION (PFC)

[75] Inventors: Issa Batarseh, Oviedo, Fla.; Peter Kornetzky, Ilmenau, Germany

[73] Assignee: University of Central Florida, Orlando, Fla.

[21] Appl. No.: 09/102,021

[22] Filed: Jun. 22, 1998

Related U.S. Application Data

[63] Continuation-in-part of application No. 60/050,476, Jun. 23, 1997.

[51] Int. Cl.$^6$ .................................................. H02M 3/335
[52] U.S. Cl. ........................... 363/16; 363/37; 323/222
[58] Field of Search .......................... 363/16, 17, 20, 363/21, 37, 89, 98; 323/222

[56] References Cited

U.S. PATENT DOCUMENTS

| | | | |
|---|---|---|---|
| 4,533,986 | 8/1985 | Jones | 363/17 |
| 5,224,025 | 6/1993 | Divan et al. | 363/16 |
| 5,416,387 | 5/1995 | Cuk et al. | 315/209 |
| 5,442,534 | 8/1995 | Cuk et al. | 363/16 |
| 5,442,539 | 8/1995 | Cuk et al. | 363/89 |
| 5,461,301 | 10/1995 | Truong | 323/207 |
| 5,479,331 | 12/1995 | Lenni | 363/21 |
| 5,510,974 | 4/1996 | Gu et al. | 363/134 |
| 5,515,257 | 5/1996 | Ishii | 363/21 |
| 5,559,688 | 9/1996 | Pringle | 363/89 |
| 5,592,128 | 1/1997 | Hwang | 331/61 |
| 5,594,629 | 1/1997 | Steigerwald | 363/21 |
| 5,598,326 | 1/1997 | Liu et al. | 363/34 |
| 5,600,546 | 2/1997 | Ho et al. | 363/21 |
| 5,619,404 | 4/1997 | Zak | 363/21 |
| 5,734,562 | 3/1998 | Redl | 363/16 |

*Primary Examiner*—Adolf Deneke Berhane
*Attorney, Agent, or Firm*—Brian S. Steinberger; Law Offices of Brian S. Steinberger

[57] ABSTRACT

One-stage power factor correction (PFC) with output electrical isolation. The converter has a configuration of combining a boost circuit and a forward circuit in one power stage. To relieve the voltage spike caused by the leakage inductance of the power transformer, two bulk storage capacitors are used. The same power switch is shared by the PFC circuit and the power conversion circuit. Due to its simplified power stage and control circuit, this converter presents a better efficiency (87%), lower cost and higher reliability. Detailed steady state analysis results show this novel converter has both good power factor correction and excellent regulation capabilities. With PSPICE simulation and experimental results, a measured power factor of 0.99 was obtained by this single switch converter.

9 Claims, 8 Drawing Sheets

Fig. 4 Storage capacitor voltage of the converter.

Fig. 5 Ac/dc conversion characteristics of the converter.

Fig. 6 Maximum duty cycle.

Fig. 7 Line regulation capability of the converter.

Fig. 8 Load regualtion capability of the converter.

Fig. 9(a) Voltage (upper) and current (lower) at the switch.

Fig. 9 (b) Line voltage and filtered input current of the converter.

Fig. 10 (a) Voltage (upper, 200V/div.) and current (lower, 2A/div.) at the switch.

Fig. 10 (b) Line voltage (upper, 200V/div.) and filtered input current (lower, 1A/div.) of the converter.

SINGLE-SWITCH AC/DC CONVERTER WITH POWER FACTOR CORRECTION (PFC)

This invention relates to AC to DC converters. This invention is a Continuation-In-Part of U.S. Provisional Patent Application 60/050,476 titled "AC/DC Converters" filed Jun. 23, 1997.

BACKGROUND AND PRIOR ART

Conventional single-phase rectifier power electronic circuits suffer from high total harmonic distortion (THD) and poor power factor. A number of regulations have been enacted recently to control the harmonic content of line current drawn by the electronic equipment. As a result, researchers have been actively seeking development of power supplies which can comply with those regulations. In recent years, many circuits and control methods were reported, in which high-frequency switching techniques were used to shape the input current waveform becomes dominate in power factor correction (PFC). See for example: A. Prasada. P. D. Ziogas, and S. Manias, "A Novel Passing Waveshaping Method for Single-Phase Diode Rectifiers," PESC'89, pp. 99–105; I. Barbi and S. A. Oliveira da Silva, "Sinusoidal Line Current Rectification at Unity Power Factor with Boost Quasi-resonant Converters," In Proceedings of IEEE-APE'90, pp. 553–562; R. Erickson, M. Madigan, and S. Singer, "Design of a Simple High-Power-Factor Rectifier Based on the Flyback Converter," In Proceedings of IEEE-APEC'90, pp. 792–801; C. Cansein and I. Barbi, "A Unity of Power Factor Multiple Isolated Outputs Switching Mode Power Supply Using a Single Switch," APEC'91, pp. 430–436; I. Takahashi, R. Y. Igarashi, "A Switching Power Supply of 99% Power Factor By the Dither Rectifier," INTELEC 1991, pp. 714–719; M. J. Schutter, R. L. Steigerwald, M. H. Kheraluwala, "Characteristics of Load Resonant Converters Operated in a High Power Factor Mode," IEEE APEC 1991, pp. 5–16; M. Madigan, R. Erickson, E. Ismail, "Integrated High Quality Rectifier-Regulators," IEEE PESC 1992, pp.1–9; R. Redl, L. Balogh and N. O. Sokal, "A New family of single-stage isolated power-factor correctors with fast regulation of the output voltage," IEEE PESC'94 Record, pp. 1137–1144; P. Kornetzky, H. Wei and I. Barteseh, "A Novel One-Stage Power Factor Correction Converter," IEEE APEC'97 Proc., pp. 251–258; Y. S. Lee, K. W. Sui and B. T. Lin, "Novel Single-Stage Isolated Power-Factor-Corrected Power Supplies with Regenerative Clamping," IEEE APEC'97 Proc., pp. 259–265; L. Huber and M. M. Jovanovici, "Single-Stage, Single-Switch, Isolated Power Supply Technique with Input-Current Shaping and Fast Output-Voltage Regulation for Universal Input-Voltage-Range-Application," IEEE APEC'97 Proc., pp. 272–280.

The implementation of high frequency techniques can be classified into two categories, ie. two-stage scheme and one-stage scheme. In a two-stage scheme, an ac/dc converter with power factor correction is connected to the line, followed by a dc/dc converter. These two power stages can be controlled separately, and thus it makes both converters possible to be optimized. The drawbacks of this scheme are lower efficiency due to twice processing of the input power, larger control circuits, higher cost and low reliability.

One-stage scheme combines the PFC circuit and power conversion circuit in one stage. Due to its simplified power stage and control circuit, this scheme is potentially more efficient. The underline strategy of this scheme is to design the circuit in a certain way that allows its PFC circuit and power conversion circuit to share the same power switch. Several PFC circuits have been reported. See for example: C. Cansein and I. Barbi, "A Unity of Power Factor Multiple Isolated Outputs Switching Mode Power Supply Using a Single Switch," APEC'91, pp. 430–436; I. Takahashi, R. Y. Igarashi, "A Switching Power Supply of 99% Power Factor By the Dither Rectifier," INTELEC 1991, pp. 714–719; M. J. Schutter, R. L. Steigerwald, M. H. Kheraluwala, "Characteristics of Load Resonant Converters Operated in a High Power Factor Mode," IEEE APEC 1991, pp. 5–16; M. Madigan, R. Erickson, E. Ismail, "Integrated High Quality Rectifier-Regulators," IEEE PESC 1992, pp. 1–9; R. Redl, L. Balogh and N. O. Sokal, "A New family of single-stage isolated power-factor correctors with fast regulation of the output voltage," IEEE PESC'94 Record, pp. 1137–1144. These circuits are especially attractive in low cost, low power applications. However, some drawbacks still exist: a) owing to improperly sharing of the power switch, when the converter operates at high frequency, the unavoidable leakage inductance of their power transformers produce high voltage spike at the switching time, resulting in decreased efficiency; b) because the power switch performs both PFC and regulation purposes, their regulation capabilities are limited; and, c) at high current and low duty ratio operation, a high voltage presents on the bulk capacitor, resulting in a high rating in design and hence raising the cost. Recently, several single switch converter topologies have been presented to overcome the above drawbacks. See for example: P. Kometzky, H. Wei and I. Barteseh, "A Novel One-Stage Power Factor Correction Converter," IEEE APEC'97 Proc., pp. 251–258; Y. S. Lee, K. W. Sui and B. T. Lin, "Novel Single-Stage Isolated Power-Factor-Corrected Power Supplies with Regenerative Clamping," IEEE APEC'97 Proc., pp. 259–265; L. Huber and M. M. Jovanovici, "Single-Stage, Single-Switch, Isolated Power Supply Technique with Input-Current Shaping and Fast Output-Voltage Regulation for Universal Input-Voltage-Range-Application," IEEE APEC'97 Proc., pp. 272–280.

U.S. Patents have been proposed for AC/DC converters with power factor correction but fail to overcome the problems presented above. See for example, U.S. Pat. Nos. 5,224,025 to Divan et al.; 5,416,387 and 5,442,539 to Cuk et al.; 5,479,331 to Lenni; 5,510,974 to Gu et al.; 5,515,257 to Ishii; 5,559,688 to Pringle; 5,592,128 to Hwang; 5,594,629 to Steigerwald; 5,598,326 to Liu et al.; 5,600,546 to Ho et al.; and 5,619,404 to Zak.

SUMMARY OF THE INVENTION

The first objective of the present invention is to provide a switching power supply that operates from AC line voltage having a high power factor and output isolation.

The second object of this invention is to provide for a one-stage power factor correction in an AC to DC converter.

The third object of this invention is to provide an AC to DC converter having an output transformer that allows the converter to be used for single output and multi-output applications.

The fourth object of this invention is to provide an AC to DC converter where the leakage inductance of the forward mode power transformer will not cause an additional voltage stress at the power switch so that a power switch having a lower voltage rating and less power dissipation can be used.

The fifth object of this invention is to provide an AC to DC converter which uses the leakage inductance of its' power transformer as part of the power supply design and thus replaces the bulky output choke of conventional forward mode converters.

The sixth object of this invention is to provide an AC to DC converter which operates the power transformer in a forward mode operation so that a smaller size can be chosen leading to the design of a higher power density AC to DC converter.

A preferred embodiment of the AC to DC converter combines a boost circuit, Pulse Width Modulation (PWM) switching regulator and a forward circuit in one power stage. Two storage capacitors are used to relieve the voltage spike produced by the power transformer and to provide energy to the output while AC line voltage crosses zero.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
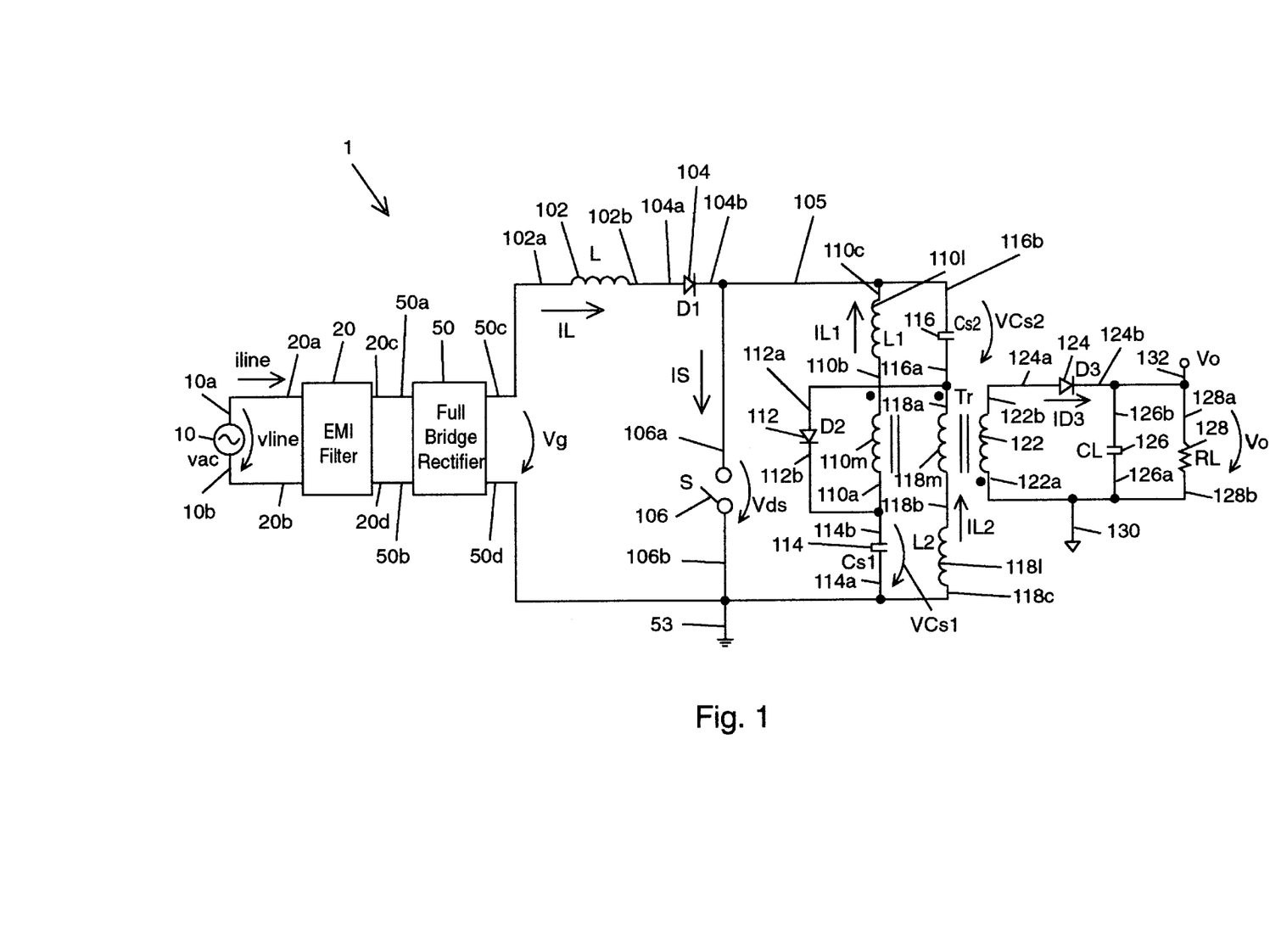
FIG. 1 is a schematic block diagram of novel AC to DC converter of the subject invention.

FIG. 1 is a schematic block diagram of novel AC to DC converter 1 of the subject invention. Referring to FIG. 1, converter 1 includes voltage supply VAC, 10, which can be alternating voltage or current line, that provides sinusoidal voltage with rms value of approximately 120 Volts or another value with a line frequency of approximately 60 Hz, and the like. Output terminals of voltage supply 10, 10a and 10b are connected to input terminals 20a and 20b of any type of an electro magnetic interference (EMI) filter 20. EMI filter, 20 includes storage devices that attenuates high transients of current passing terminals 20c and 20d on the way to the terminals 10a and 10b of voltage supply VAC. Output terminals of EMI filter 20, 20c and 20d are connected to the input terminals 50a and 50b of a line rectifier 50 of a conventional type such as KBL06 or any other type consisting of a bridge arrangement of unidirectional conducting devices such as semiconductor diodes in a way that positive voltage of output of line rectifier is delivered to terminal 50c and negative voltage is delivered to terminal 50d which is connected to ground level 53 of boost/forward (primary) stage 53. Terminal 50c is connected to terminal 102a of an inductive device L, 102, having a value of approximately 420 µH, and the like.

Terminal 102b is connected to terminal 104a of a unidirectional conducting device D1, 104 such as a fast acting semiconductor diode such as MUR850, and the like. Output terminal of D1, 104b is connected to positive terminal 106a of a controllable switching device 106, such as a solid state switch such as power MOSFET Type IRF740 or another type of a switching device, and the like. Negative terminal of switching device 106b is connected to ground level 53. Switching device 106 switches on and off with a frequency higher than line frequency and with a ratio of an on and off time that is processed from output voltage at terminal VO, 132 with respect to output ground, 130 is kept constant within small limits. While switching device S, 106, is on, Inductive device L, 102 receives energy from voltage supply VAC, 10 via EMI filter 20 and line filter 50. While switching device S 106 is off, energy stored in inductive device L, 102 is mainly transferred to the capacitive devices CS2, 116 and CS1, 114 via the chain D1, 104, and CS2, 116 and D2, 112 and CS1, 114 and terminal 50d and terminal 50c to terminal 102a of inductive device L, 102. The capacitances of capacitive devices CS1, 114 and CS2, 116 have a value of approximately 820 µF that is great enough to keep the voltages VCS1 and VCS2 across capacitive devices CS1, 114 and CS2, 116 constant within small limits at a value that is always greater than peak value of voltage supply VAC, 10 during normal operation. D2 is a unidirectional conducting device such as a fast acting semiconductor diode such as V336X and the like. This mode of operation is alike a boost converter and shapes the average current drawn from the power supply VAC, 10 to be of the same shape like the voltage Vline across the power supply VAC, 10. Referring to FIG. 1, forward mode transformer TR, 100 consists of two primary windings 110m and 118m with equal turn numbers and secondary winding 122. The turn ratio of windings 110:118:122 is approximately 1:1:0.4. Furthermore leakage inductors L1, 108 and L2, 120, have a value of approximately 260 µH (each) and the like, in serial to primary windings 110m and 118m respectively.

Referring to FIG. 1, storage capacitors CS1, 114 and CS2,116 are connected to the primary part of forward mode transformer TR, 100 as follows: Terminal 114a of capacitive device CS1, 114 and terminal 118c of leakage inductance L2, 118 are connected to ground 53. Terminal 114b of capacitive device CS1, 114 and terminal 112b of unidirectional conducting device are connected together with terminal 110a of primary winding 110m. Terminal 116a of capacitive device CS2, 116 and terminal 112a of unidirectional conducting device are connected together with terminal 118a of primary winding 118m. Terminal of 110c of leakage inductance L1, is connected to terminal 116b of capacitive device CS2, 116 and to terminal 106a of switching device 106. The terminals 110b, 118a and 122a of forward mode transformer are marked with a dot. They are marked as the beginning of the windings, this means that they always have the same polarity with respect to the terminals 110a, 118b and 122b. While switching device S, 106 is on, energy is transferred from the capacitive devices CS1, 114 and CS2, 116 to the secondary winding 122 of forward mode transformer TR, 100. While this happens part of the energy stored in the capacitive devices CS1, 114 and CS2, 116 is also stored in the leakage inductors L1, 110 and L2, 118. These two inductors act as a current limiter for energy transfer. If switching device S, 106 is off, energy stored in the leakage inductors L1, 110 and L2, 118 is fed back into the storage devices CS2, 116 and CS1, 114 as well as into the secondary winding, 122 of forward mode transformer TR, 100. The secondary winding 122 can be completely isolated from the primary side. RL represents the resistive part of a possible load between the output terminal VO, 132 of converter and output ground 130. Secondary winding 122 and uniconducting device D3, 124 can be an unidirectional conducting device such as a fast acting semiconductor diode such as MUR850 and the like. Components 122, 124 and capacitive device CL, 126 form a closed loop, where current flow is only allowed towards terminal 124b of semiconducting device D3. Terminals 122a of secondary winding 122 and negative terminal 126a of capacitive device CL are connected to output ground level. Capacitive device CL has a value of approximately 900 μF, that keeps output voltage VO constant within small limits while current ID3 of uniconducting device D3, 124 is not equal to load current IL.

Figure 2:
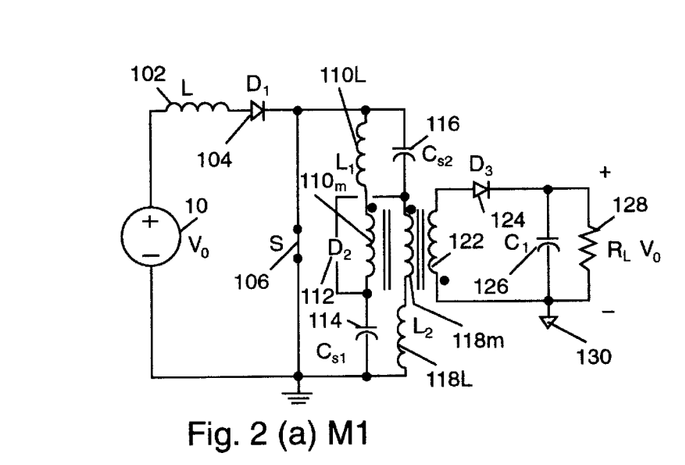
FIG. 2A is a circuit of a first operation mode using the conducting device of FIG. 1 during a first time interval.
FIG. 2B is a circuit of a second operation mode using the conducting device of FIG. 1 during a second time interval.
FIG. 2C is a circuit of a third operation mode using the conducting device of FIG. 1 during a third time interval.
FIG. 2D is a circuit of a fourth operation mode using the conducting device of FIG. 1 during a fourth time interval.
Figure 3:
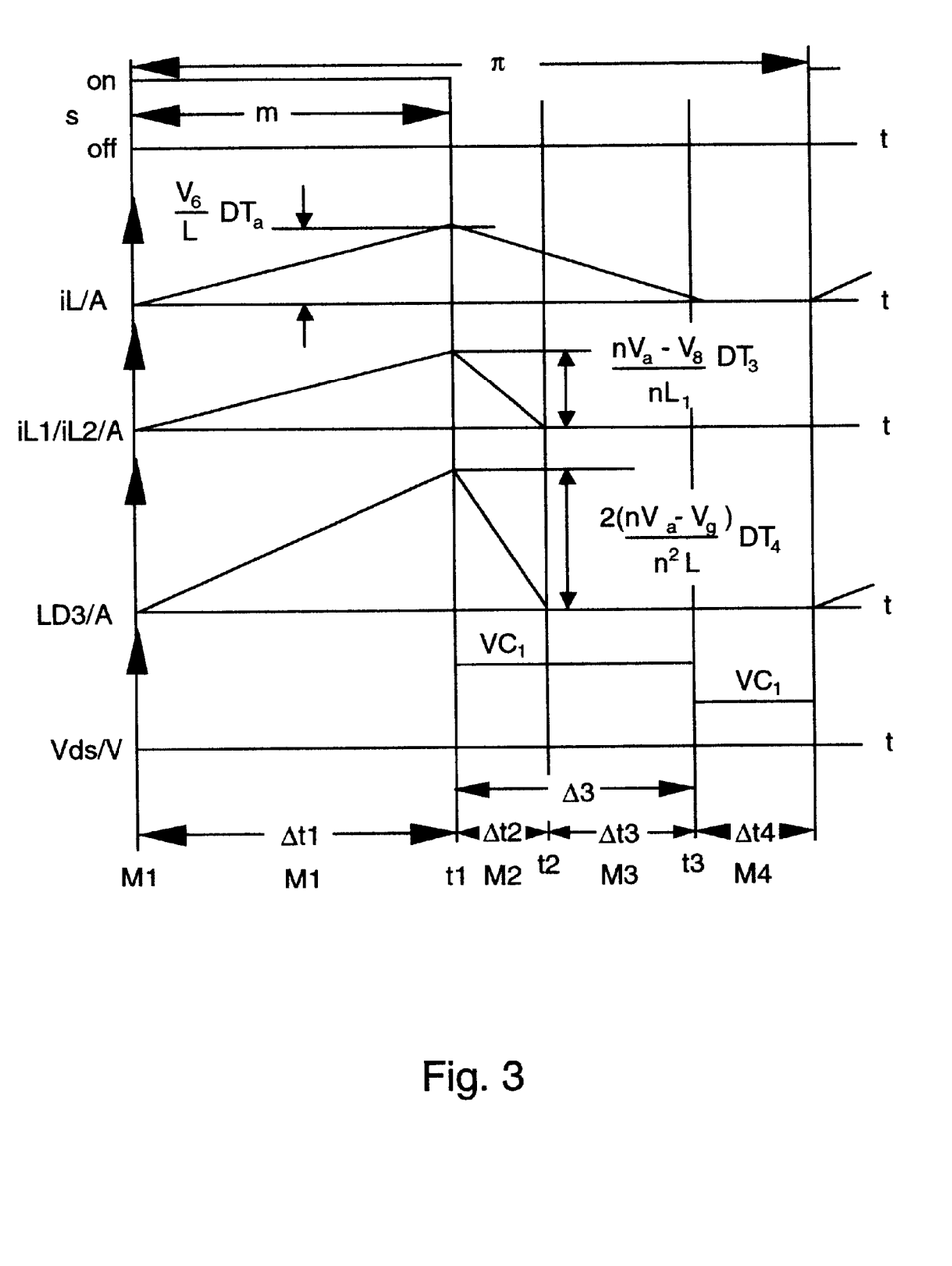
FIG. 3 shows a theoretical key waveform of the novel AC/DC converter of FIG. 1.

The basic circuit schematic of the novel single switch converter is shown in FIG. 1A. It can be shown that in steady state the converter operates in four operation modes during one switching cycle. Table I shows the four modes of operation and conducting devices during their corresponding time intervals. The equivalent circuits of the four operation topologies are shown in FIG. 2 and converter key waveforms are shown in FIG. 3.

Notice that in one switching cycle, the line voltage can be considered as a constant voltage 10, represented by Vg in the equivalent circuits. Capacitors CS1 11.4 and CS2 11.6 are designed to be large and equal. Hence, in the steady state analysis, each capacitor voltage was approximated by a dc source VCs1=VCs2=VCs. The four modes of operation are discussed as follows:

TABLE I

Modes of operation

|  |  | Conducting device | | | |
| --- | --- | --- | --- | --- | --- |
| Mode | Time interval | S 106 | D1 104 | D2 112 | D3 124 |
| M1 | t0 ≦ t < t1 | x | x |  | x |
| M2 | t1 ≦ t < t2 |  | x | x | x |
| M3 | t2 ≦ t < t3 |  | x | x |  |
| M4 | t3 ≦ t < t0 + Ts |  |  |  |  |

A. Mode 1(t0≦t<t1)

Referring to FIG. 2a, mode 1 begins at t=t0 when the power switch is turned ON 106. With diode D1 104 conducting, the source voltage is applied to the input choke inductor L 102, causing the current through the inductor increasing linearly. During this mode, energy is transferring from the source to the choke inductor. On the other hand, diode D2 112 is blocked by the two-capacitor voltages since the positive end of CS2 is grounded by the power switch. Thus, the diode splits the primary sides of the forward transformer into two symmetrical branches with one storage capacitor in each. These capacitors (previously charged) feed the primary sides of the forward transformer individually, resulting in part of the energy stored in the two capacitors being transferred to load, represented by load register RL, 128 and to output storage capacitor Cf during this mode.

This mode ends at t=t1 when the power switch is turned OFF as shown in FIG. 3. During this mode, we have $$i_L(t) = i_{D1}(t) = \frac{V_g}{L}t; \qquad (1a)$$

$$i_{L1}(t) = i_{L2}(t) = \frac{nV_{Cs} - V_o}{nL_1}t;$$

$$i_{D3}(t) = \frac{2}{n}i_{L1}(t) = \frac{2(nV_{Cs} - V_o)}{n^2 L_1}t;$$

$$i_{D2}(t) = 0; V_{ds}(t) = 0.$$

The duration of this stage is $$\Delta t1 = DTs. \qquad (1b)$$

Where $$D = \frac{t_1 - t_0}{T_s}$$

is the duty cycle.

B. Mode 2(t1≦t<t2)

Referring to FIG. 2b, during this operation mode, the power switch is turned OFF and diode D2 is turned ON due to a current iL+2 iL1 flowing through it. The equivalent topology is shown in FIG. 2 (b). Under the constraint of KCL, both the storage capacitors, Cs1 and Cs2, are being charged by current iL+iL1 during this operation mode. With the linear decreasing of the inductor current iL, magnetic energy stored in the choke L, 102 is being converted into electric energy and being stored into the storage capacitors. Thus the energy loss of the storage capacitors during Mode1 is being recovered. At the same time, the leakage inductances L1, 101l and L2, 118l of forward transformer is being demagnetized and its magnetizing energy is fed back to the output and to the capacitors CS1, 114 and CS2, 116. When the leakage inductances L1, 110l and L2, 118l of the forward transformer is completely demagnetized, i.e. iL1 and iL2 become zero, the converter's operation enters Mode 3. Using FIG. 2(b), the following expressions are obtained:

$$i_L(t) = i_{D1}(t) = \frac{V_g}{L}DT_s - \frac{2V_{Cs} - V_g}{L}(t - DT_s); \qquad (2a)$$

$$i_{L1}(t) = i_{L2}(t) = \frac{nV_{Cs} - V_o}{nL_1}DT_s - \frac{nV_{Cs} - V_o}{nL_1}(t - DT_s);$$

$$iD2 = iL + 2iL1; \quad i_{D3} = \frac{2}{n}i_{L1};$$

$$V_{ds} = 2V_{Cs}.$$

The time intervals Δt2 is given by:

$$\Delta t_2 = t_2 - t_1 = \frac{nV_{Cs} - V_o}{nV_{Cs} + V_o} DT_s. \quad (2b)$$

C. Mode 3 (t2≦t<t3)

Referring to FIG. 2c, the choke inductor current, iL, continues to decrease linearly in this mode. Owing to the existence of diode D3, the primaries of the transformer present very high impedance (FIG. 2 (c)) with the currents through the windings can be negligible for energy transfer to the output. This mode ends when the choke inductor current reaches zero. The key voltages and currents in this duration can be described as followed.

$$i_L(t) = i_{D1}(t) = i_{D2}(t) = \frac{V_g}{L}DT_s - \frac{2V_{Cs} - V_g}{L}(t - DT_s); \quad (3a)$$

$$i_{L1}(t) = i_{L2}(t) = i_{D3}(t) = 0;$$

$$V_{ds} = 2V_{Cs}.$$

The time intervals are:

$$\Delta t_3 = \Delta t_3 - \Delta t_2, \quad (3b)$$

$$\text{where } \Delta t_3 = \frac{V_g}{2V_{Cs} - V_g} DT_s. \quad (3c)$$

D. Mode 4 (t3 ≦t<Ts+t0)

Referring to FIG. 2d, the operation mode between t3 and t0+Ts, when the cycle repeats, is known as a free wheeling stage, which is used for regulation purposes. When the power switch is turned ON again at t=Ts+t0, the converter operation goes into the next cycle. During this mode, we have $$iL(t)=iL1(t)=iL2(t)=iD1(t)=iD2(t)=iD3(t)=0; \quad (3a)$$

The time interval is given by, $$\Delta t_4 = T_s - DT_s - \Delta t_2 - \Delta t_3. \quad (3b)$$

Steady State Analysis

The steady state analysis of an ac/dc converter involves two operation frequencies, i.e. line frequency $f_L$ (50 Hz or 60 Hz) and high switching frequency fs. The input of the power stage is a rectified sinusoidal which means the conversion ratio M is varying periodically. Dc/dc steady state analysis can be made on the power stage but conceptually, some of the results may not be applied directly to its corresponding ac/dc converter because the input is not a steady dc voltage. In the actual case of ac/dc, the steady state duty ratio will not follow its dc/dc conversion characteristic. Sampling at the output, the feed back loop will give the duty ratio to control the power flow from storage capacitors to the load. Due to the large value of capacitance of the storage capacitors, the capacitor voltages almost remain as dc, resulting in a smaller shifting in duty ratio with line cycle. In the sense of energy transferring, the input circuit (boost circuit) is an energy compensator for the storage capacitors to keep the average input power being equal to the output power. Therefore, ac/dc steady state analysis can be approximated by replacing the dc input voltage and duty ratio in its dc/dc steady state analysis by effective (i.e. rms) value of the rectified sinusoidal voltage (i.e. the line voltage) and average duty ratio respectively.

In the steady state analysis of the converter invention, the following notations were adopted:

*D* — dc/dc duty ratio;

*Dac* — ac/dc duty ratio;

*Dmax* — maximum duty ratio;

*Dac, nom* — nominal ac/dc average duty ratio;

*Vg* — dc input voltage;

*Vo* — output voltage;

*v*line(*t*) — line voltage;

*i*line(*t*) — line current;

*V*line, rms — rms value of line voltage;

*VCs* — average voltage across the storage capacitor;

*Ts* = 1 / *fs* — switching period;

*n* — transformer turn ratio;

*TL* = 1 / *fL* — line period;

$\tau_n = \frac{L}{R_L} fs$ — normalized load;

$M \triangleq \frac{V_o}{V_g}$ — dc/dc conversion ratio;

$M_{ac} \triangleq \frac{V_o}{V_{line,rms}}$ — ac/dc conversion ratio;

$k = \frac{L_1}{L} = \frac{L_2}{L}$ — inductor ratio;

$m \triangleq \frac{V_{Cs}}{V_o}.$

A. Ac/Dc Conversion Ratio

Using the rms value of the line voltage as the input of the converter, the voltage across the storage capacitor can be determined by, $$m = \frac{1}{2}\left[\frac{1}{n} + \frac{kn\tau_n}{2D^2} + \sqrt{\left(\frac{1}{n} + \frac{kn\tau_n}{2D^2}\right)^2 + \frac{2k\tau_n}{D^2}}\right]. \quad (4)$$

Where $$m \triangleq \frac{V_{Cs}}{V_o}$$

When k, n and τn are less than one, VCs can be roughly given by $$V_{Cs} \approx \frac{1}{n}V_o \quad (5)$$

Based on the assumption of lossless converter, we have Pin,ave=Pout,ave, i.e.

$$V_g \cdot I_{in,ave} = \frac{V_o^2}{R_L},$$

resulting in the following ratio,

-continued $$\frac{D^2 T_S}{L} V_{Cs} \frac{V_g^2}{2V_{Cs} - V_g} = \frac{V_o^2}{R_L}.$$

Solving above equation for M, it gives $$M = \frac{1}{4}\left(\frac{1}{m} + \sqrt{\frac{1}{m^2} + 8\frac{D^2}{\tau_n}}\right). \quad (6)$$

Where $$M \triangleq \frac{V_o}{V_{line,rms}},$$

Figure 4:
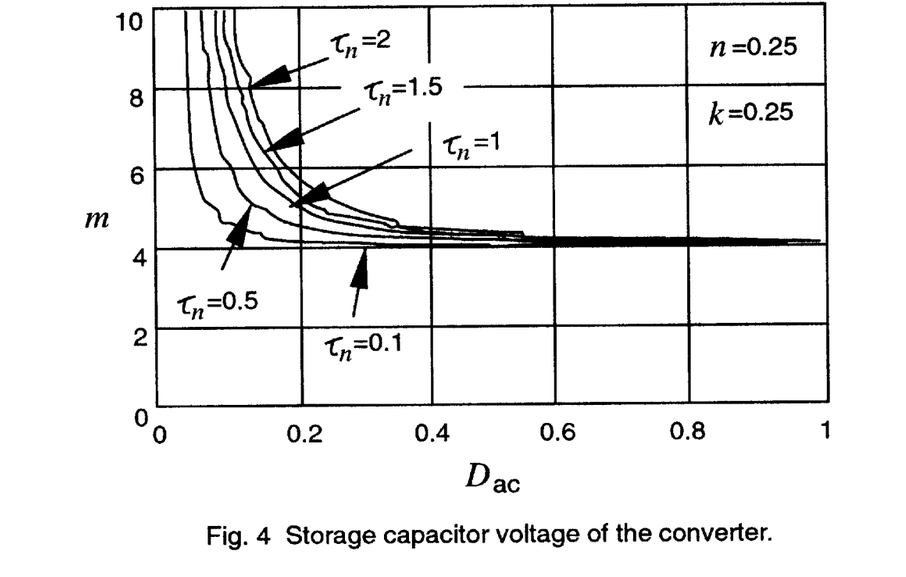
FIG. 4 shows the storage capacitor voltage of the novel AC/DC.

From Eq. (4), a graph showing m vs. D under different normalized loads is given in FIG. 4 for n=0.25 and k=0.16. It can be seen that m drops quickly when duty ratio increasing from zero to 0.2, even at heavy load as $\tau_n$=2. This means we have almost a constant storage capacitor voltage in the operation range of duty ratio.

Figure 5:
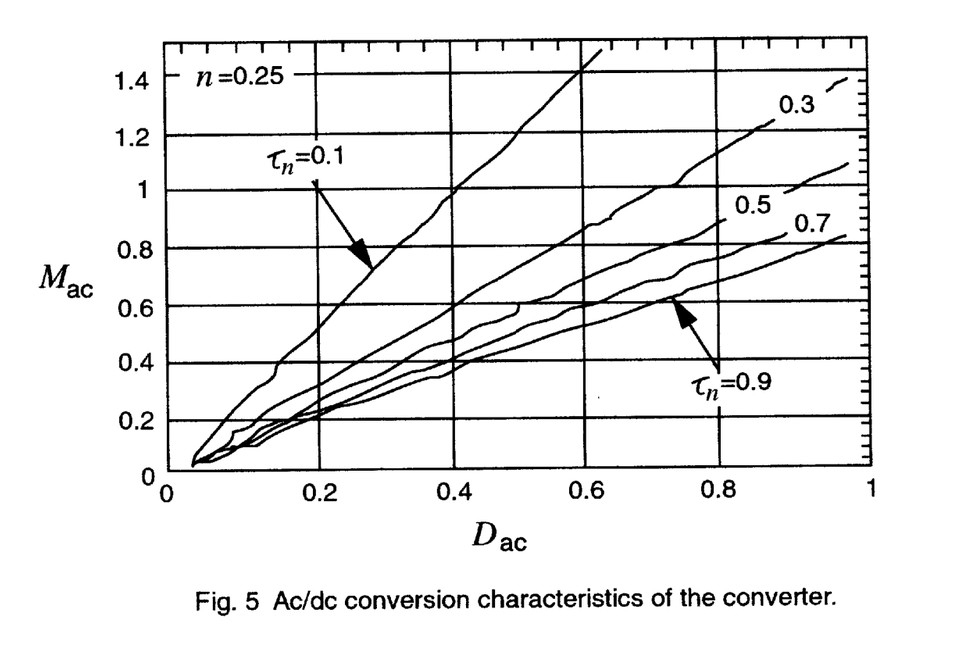
FIG. 5 shows the AC/DC conversion characteristics of the novel converter.

From Eqs. (4) and (6), a group of curves, $M_{ac}$ vs. $D_{ac}$ under different $\tau_n$'s, can be obtained as shown in FIG. 5. The ac/dc conversion characteristics of this converter can be investigated by examining these curves. It can be seen that for a certain load $\tau_n$, ac/dc conversion ratio can be adjusted by changing the duty ratio of its driving signal. We may note that at light load (low $\tau_n$), the proposed converter can operate as both boost and buck converter.

B. Maximum Duty Ratio and Regulation Capabilities

According to the key waveforms shown in FIG. 3, the duty ratio $D_{ac}$ is limited by the following equation:

$$\Delta t_1 + \Delta t'_3 \leq T_S \quad (7)$$

Substitute Eqs. (1b) and (3c) into Eq. (7), we obtain $$D_{ac} \leq 1 - \frac{1}{\sqrt{2}} \frac{1}{M_{ac}m}.$$

The maximum duty ratio is defined as $$D_{max} = 1 - \frac{1}{\sqrt{2}} \frac{1}{Mm} \quad (8)$$

In order to study the line and load regulation capabilities, we express the ac duty ratio in terms of M and $\tau_n$ as $$D = \sqrt{\frac{M\tau_n}{2a}\left(-b + \sqrt{b^2 - 4ac}\right)} \quad (9)$$

where
a=2M−kn;
b=−4M²+2n(1+2k)M+kn²;
c=−2knM (n+2M).

From Eqs. (4)–(9), characteristic curves for $D_{max}$ vs. n under different conversion ratios, D vs. M under different loads and D vs. $\tau_n$ under different conversion ratios, are given in FIGS. 6, 7 and 8, respectively. From Eq. (8), we notice that the maximum duty ratio is independent of $\tau_n$. FIG. 7 shows the maximum conversion ratio as a function of M.

Figure 6:
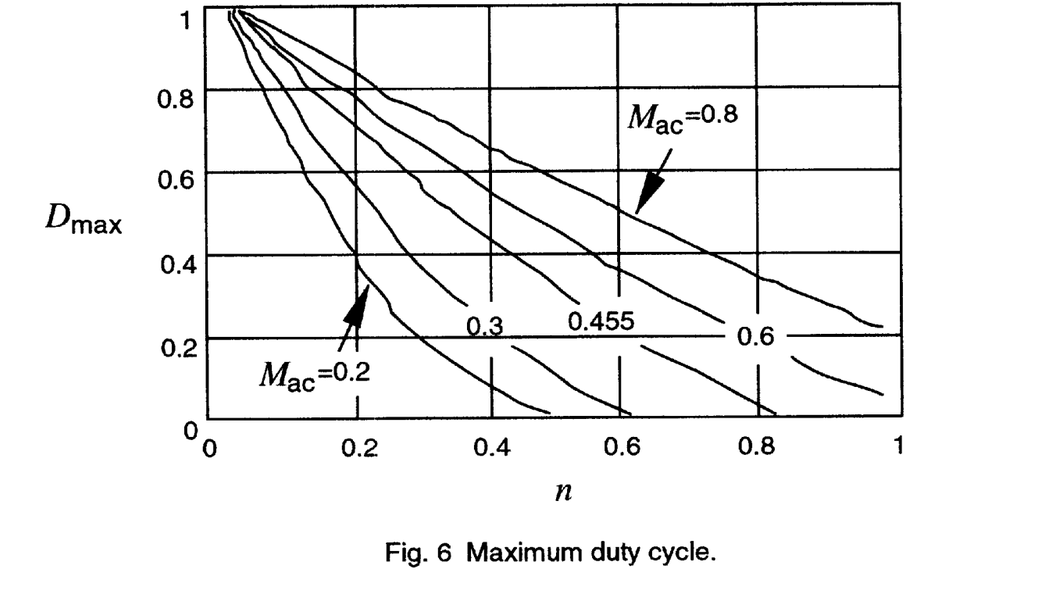
FIG. 6 shows the maximum duty cycle for the novel converter.
Figure 7:
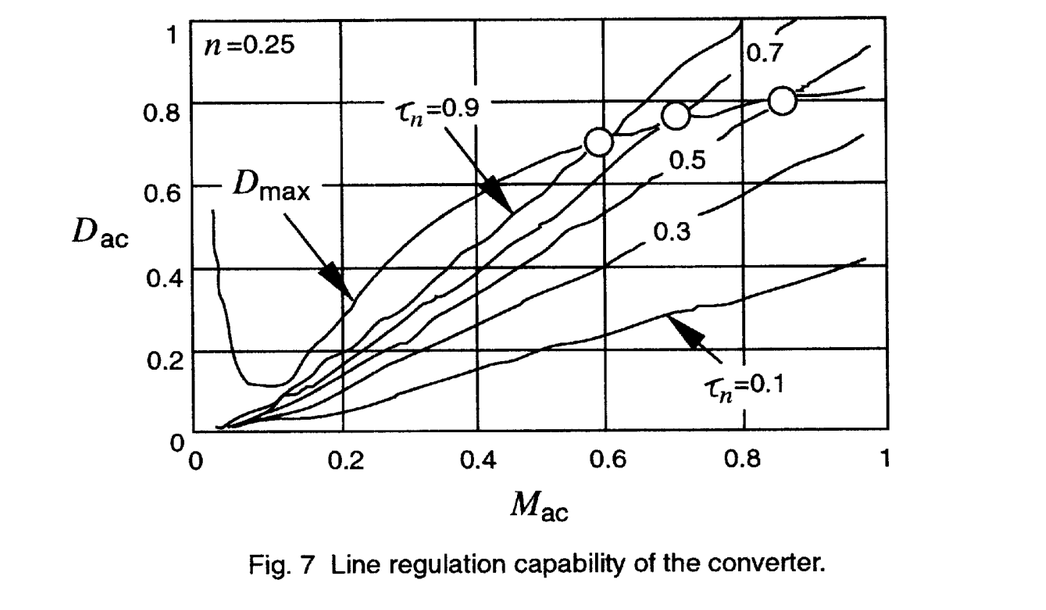
FIG. 7 shows the line regulation capability of the novel converter.

From FIG. 6, it can be seen that for a given conversion ratio M, the smaller the transformer turn ratio is, the larger the maximum duty ratio will be. In practical application, selection of n should be made based on the trade off between regulation capabilities and device stresses.

Referring to FIG. 7, we can investigate the line regulation capability of the proposed ac/dc converter. For example, the converter was designed with n=0.25, Vo=50V. At load m $\tau$n=0.5, the Mac gain can change between 0.1 to 0.82, which means theoretically, the output can be kept at 50V while the input voltage is changing within the range of 61V~500V. The duty ratio range is between 0.08 to its maximum 0.8. In short, a±20% variation in the line voltage requires the duty ratio change by 58% to maintain constant output.

Figure 8:
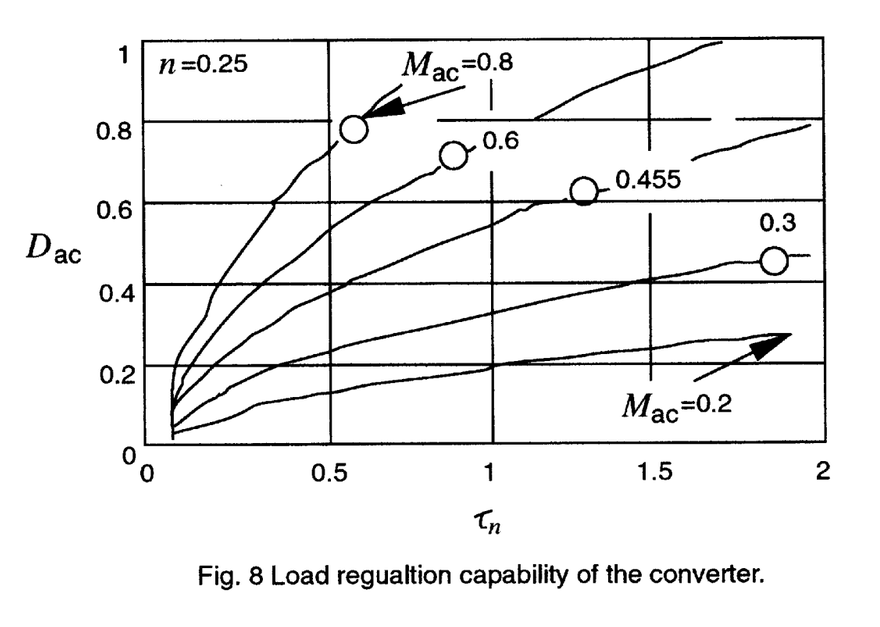
FIG. 8 shows the load regulation capability of the converter.

Similarly, the load regulation capability can be examined by using FIG. 8. For an ac/dc converter with n=0.25,fS= 50×10³ Hz, L=300 µH, Mac=0.455 (Vline,rms=110V, Vo=50V), theoretically, $\tau$n can vary between 0.1 to 1.3 with the output voltage being kept at 50V. If the load changes±50%, to maintain a constant output, a duty ratio change of 66% is required.

C. Power Factor Correction

The line current is determined by $$i_{line}(t) = \frac{v_{line}(t)D^2 T_s}{2L} = \frac{D^2 T_s}{2L} \sqrt{2} V_{line,rms} \sin\omega_L t. \quad (10)$$

where: $\omega$L is the line angular frequency.

Since Ts and L are constant and Dac is nearly constant, iline(t) and vline(t) have the same wave-shape. Therefore, a good power factor can be obtained by the novel converter.

D. Voltage and Current Stresses

TABLE II

Voltage and current stresses on switch and diodes under nominal condition

| Device | Voltage Stress | Current Stress |
| --- | --- | --- |
| S 106 | 2Vcs | $\left(\frac{\sqrt{2} V_{line,rms}}{L} + 2\frac{nV_{Cs} - V_o}{nL_1}\right)DT_S$ |
| D1 104 | 2Vcs | $\frac{\sqrt{2} V_{line,rms}}{L}DT_S$ |
| D2 112 | 2Vcs | $\left(\frac{\sqrt{2} V_{line,rms}}{L} + 2\frac{nV_{Cs} - V_o}{nL_1}\right)DT_S$ |
| D3 124 | Vo + nVcs Approximately | $2\frac{nV_{Cs} - V_o}{n^2 L_1}DT_S$ |

Through steady state analysis, the voltage and current stresses on each switch were found as listed in Table II.

E. Output Voltage Ripple

By integrating the current through the output capacitor Cf, the output voltage ripple is given by $$\frac{\Delta V_o}{V_o} = \frac{m}{2nL_1 C_f f_S^2} \frac{(2Dmn - 2D - n^2 k\tau_n)^2}{m^2 n^2 - 1}. \quad (11)$$

F. Critical Choke Inductance

The critical choke inductance was found as $$L_{crit} = \frac{DR_L}{f_s M^2}. \quad (12)$$

To ensure the converter operating in DCM, the choke inductor must be selected with a value smaller than the critical inductance.

Guideline of the Single Switch Converter

The novel ac/dc converter can be based on the following principles:

a) Selection of Transformer Turn Ratio n

Selection of transformer turn ratio should be based on the trade off between regulation capabilities and voltage stresses on the devices. According to Eq. (5), a low n will result in high voltage across the storage capacitors. Since all the voltage stresses on the switches (S and D1~D3) depend on VCs, we prefer a higher transformer turn ratio. On the other hand, from FIG. 6, a higher n causes the maximum duty cycle to be lower, reducing both the line and load regulation capabilities. Hence, a lower transformer turn ratio is desired in this case. In practical design, a proper value of n should be chosen so that it gives enough regulation capabilities and lower voltage stresses as well.

b) Setting of Nominal Duty Ratio and Normalized Load

When n has been chosen, a group of curves as shown in FIG. 8 for n=0.25 can be generated. The nominal duty ratio can be approximated by $$D,\text{nom}=0.1+0.5(D\text{max}-0.1) \quad (13)$$

In the above equation, we assumed that the minimum duty ratio is 0.1. In FIG. 8, corresponding to the nominal duty ratio, normalized load m can be found.

c) Selection of Choke Inductance

The value of choke inductance is given by $$L = \tau n \, RL \, TS \quad (14)$$

d) Selection of L1 and L2

From Table II, it seems that to relieve high current stresses, we should increase the inductance L1. But the effect will be very weak because the storage capacitor voltage increases with the increasing of k=L1/L as shown in Eq. (6c). In practical design, we prefer a small value of k so that the voltage stresses can be reduced. For a given k, L1=L2 can be selected according to $$L1=L2=k\,L. \quad (15)$$

e) Selection of the Storage Capacitance

To select the storage capacitors, let's consider that due to the missing of one line cycle, an average voltage drop of kcVCs on the storage capacitor is allowed, then by analysis we have $$C_S \geq \frac{T_L}{k_c(2-k_c)R_L m^2}, \quad (16)$$

and the voltage stress on the storage capacitor can be calculated by $$VCs = m\,Vo, \quad (17)$$

where m can be determined by Eq. (4).

Based on Eqs. (16) and (17), the storage capacitors can be selected.

f) Selection of Output Capacitor

From Eq. (11), we get $$C_f = \frac{m}{2nL_1 f_S^2} \frac{(2Dmn - 2D - n^2 k\tau_n)^2}{m^2 n^2 - 1} \frac{1}{\frac{\Delta V_o}{V_o}}. \quad (18)$$

For a given design with specified ripple factor, we can find an output capacitance. Together with the output voltage, an output capacitor can be chosen.

g) Selection of Switches

The selection of switches should be based on their voltage and current stresses which can be calculated according to the equations listed in Table II.

Let us consider the following specifications as a design example:

Nominal input voltage: Vline,rms=110V@60 Hz;

Input voltage: Vline,rms=85V~130V@60 Hz;

Output voltage: Vo=50V±2.5%;

Nominal load: 1A;

Switching frequency: fs=50 KHz.

Based on the above guidelines, we obtain the converter parameters as follows.

a) Transformer turn ratio n:

From FIG. 6, let's select n=0.25 which gives a maximum duty ratio of 0.65 at Mac=0.455.

b) The average duty ratio at nominal input is:

$$D,\text{nom}=0.1+0.5(D\text{max}-0.1)=0.1+0.5(0.65-0.1)\approx 0.38.$$

From FIG. 8, τn=0.5 can be chosen.

c) The choke inductance is hence determined by $$L = \tau n \, RL \, TS = 0.5 \times 50 \times 2 \times 10^{-5} = 500 \mu H$$

d) Let's choose k=0.16. Then we can select L1 and L2 as $$L1 = L2 = k\,L = 0.16 \times 500 = 80 \,\mu H$$

e) Suppose that due to one line cycle missing, an average voltage drop of 0.1VCs on the storage capacitor is allowed, i.e. kc=0.1. Then we have $$C_S \geq \frac{T_{line}}{k_c(2-k_c)R_L m^2},$$

where $$m = \frac{1}{2}\left[\frac{1}{n} + \frac{kn\tau_n}{2D^2} + \sqrt{\left(\frac{1}{n} + \frac{kn\tau_n}{2D^2}\right)^2 + \frac{2k\tau_n}{D^2}}\right]$$

So $$C_S \geq \frac{1.667 \times 10^{-2}}{0.1 \times (2-0.1) \times 50 \times 4.14^2} = 102 \,\mu F,$$

and VCs=m Vo=207V.

Select CS=110 μF@250V.

f) From Eq. (18), the output capacitance can be determined by $$C_f = \frac{m}{2nL_1 f_s^2} \frac{(2Dmn - 2D - n^2 k\tau_n)^2}{m^2 n^2 - 1} \frac{1}{\frac{\Delta V_o}{V_o}}$$

$$= 5.423 \, \mu F$$

We select Cf=10 $\mu$F@100V.

g) From Table II, we calculate the theoretical diode and switch voltage and current stresses as listed in Table III.

TABLE III

Theoretical switch and diodes voltage and current stresses under nominal condition

| Device | Voltage Stress (V) | Current Stress (A) |
|---|---|---|
| S | 414 | 3.69 |
| D1 | 414 | 2.36 |
| D2 | 414 | 3.69 |
| D3 | Approximately 153.5 | 5.32 |

According to the above-calculated stresses and considering switching time, we choose:

S: IRF840; D1, D2 and D3: MUR850.

Simulation and Experimental Results

Figure 9A:
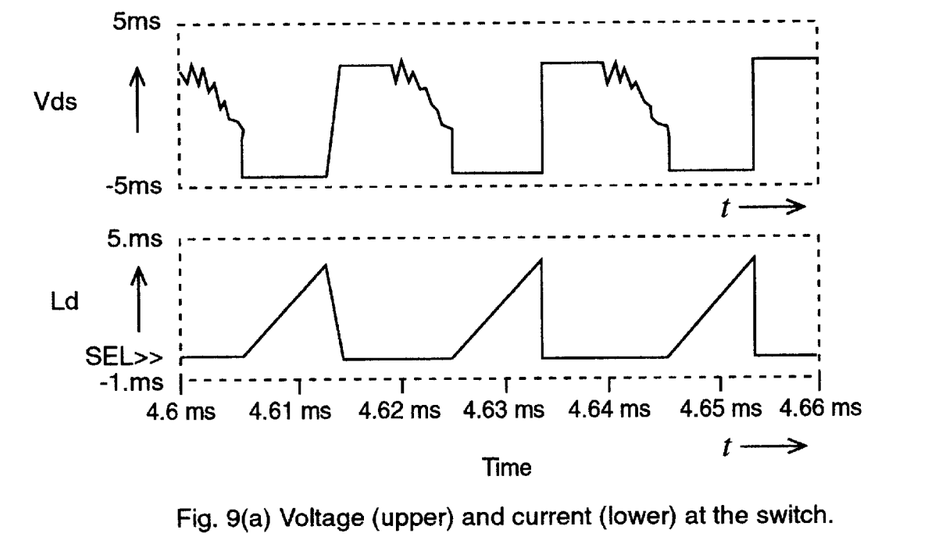
FIG. 9a shows the simulation waveforms of the novel converter for voltage (upper) and current (lower) at the switch.
Figure 9B:
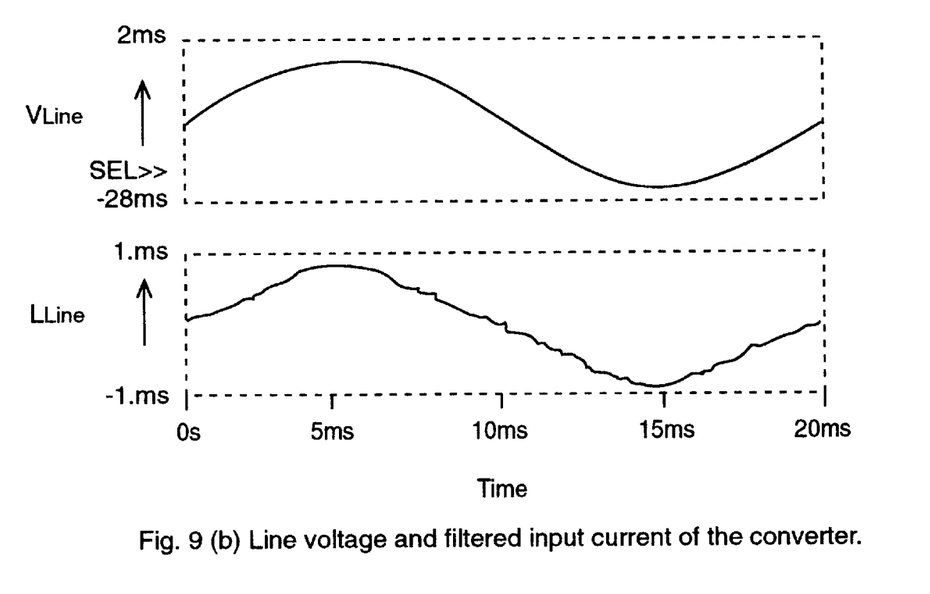
FIG. 9b shows the simulation waveforms of the novel converter for line voltage and filtered input current.
Figure 10:
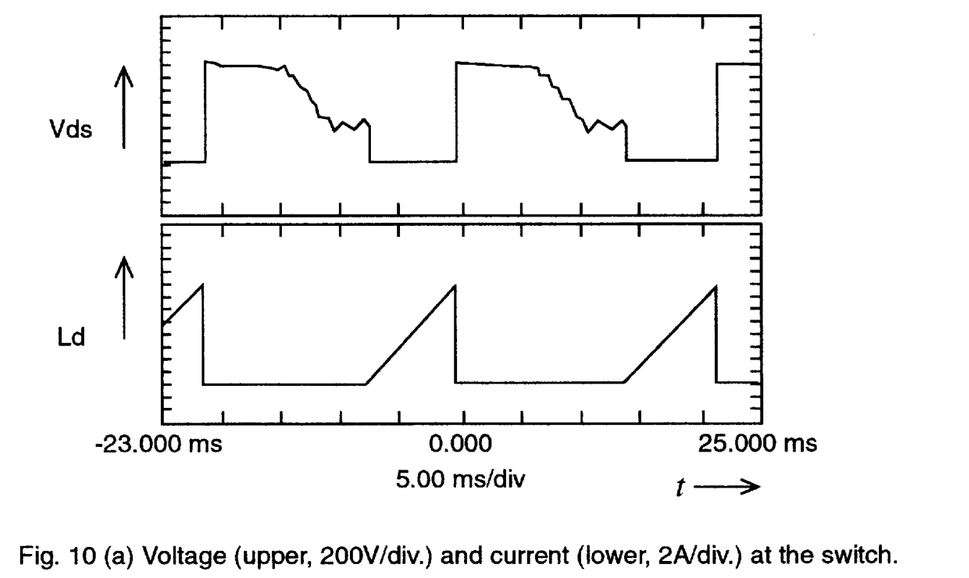
FIG. 10a shows the measured waveforms of the converter for voltage (upper, 200V/div.) and current (lower, 2A/div.) at the switch.
FIG. 10b shows the measured waveforms of the converter for line voltage (upper, 200V/div) and filtered input current (lower, 1A/div.) of the converter.

By using the above circuit parameters, a closed-loop schematic of the proposed single switch converter was simulated by PSPICE and the simulation results are shown in FIG. 9. An experimental prototype of the converter was built up in the laboratory with the same circuit parameters. To obtain the transformers ratio (n=0.25), the primary windings and secondary windings were built with exciting inductance. Pulse-width-modulation chip SG3525 was used for the closed-loop control. The experimental waveforms of voltage and current at the switch and filtered line current, shown in FIG. 10a and 10b, were recorded by using an hp54542A oscilloscope. Both the simulated and the experimental waveforms agree well and show that the waveforms of the line voltage and the input current are almost sinusoidal ones with no phase difference, proving that a good power factor can be achieved by this converter topology. The measured power factor is 0.99. In the experiment, and an efficiency of 87% was obtained. Measured power factor and efficiency shows that the novel AC to DC converter can maintain 99% PF with the line changing from 85V AC to 135V AC. At the nominal load, 87% efficiency was obtained.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A power supply that provides a DC(Direct Current) power to a load from an AC (Alternating Current) source comprising:

a rectifying stage for transferring electrical energy from an AC source into pulsating unipolar voltage pulses at output terminals;

a boost stage having a controllable conducting means and a first unidirectional conducting means for controlling current flow from the output terminals of the rectifying stage and blocking the current flow into the opposite direction and a single controllable switching device connected across the output terminals; and an inductively coupled forward stage for connecting to a load; and an inductive-capacitive stage connected between said boost stage and said forward stage providing an inductive energy storing circuit when said switching device is closed and a capacitive charging circuit when said switching device is open, whereby a conversion efficiency of over approximately 80% AC to DC is achieved.

2. The power supply of claim 1 whereby said inductive-capacitive stage includes:

a parallel circuit with a first branch having a first leakage inductance series connected to first primary input winding and then to a first storage capacitor, and a second branch having a second storage capacitor series connected to second primary input winding and a second leakage inductance with a second unidirectional conducting means having input terminal connected between the second storage capacitor and the second primary winding and an output terminal connected between the first primary winding and the first storage capacitor whereby energy is transferred between inductance devices and capacitance devices when the switching device is open and from the capacitance devices to the primary winding and the leakage inductances when the switching device is closed.

3. The power supply of claim 1, wherein the controllable conducting means operates with a switching frequency that is greater than approximately 10 times higher than the frequency of the said AC source.

4. The power supply of claim 3, wherein a ratio between on and off time of said controllable means is controlled by:

means for sensing at least one of voltage and current of the power supply.

5. The power supply of claim 4, wherein the ratio between on and off time of said controllable conducting means is also controlled by:

a sensed overload of the power supply.

6. The power supply of claim 4, wherein the ratio between on and off time of said controllable conducting means is further controlled by:

an external source chosen from one of: a voltage and current.

7. The power supply of claim 1, wherein the second controllable conducting means includes a device chosen from one of:

a power MOSFET, an IGBT, and a BJT.

8. The power supply of claim 1, wherein the second unidirectional conducting means includes:

semiconductor diodes.

9. The power supply of claim 1, wherein the second unidirectional conducting means includes:

a zener diode.

* * * * *